US012589660B2

(12) United States Patent
Yamada et al.

(10) Patent No.: US 12,589,660 B2
(45) Date of Patent: Mar. 31, 2026

(54) VEHICLE CONTROL APPARATUS

(71) Applicant: SUBARU CORPORATION, Tokyo (JP)

(72) Inventors: Keigo Yamada, Tokyo (JP); Yoshinobu Yamazaki, Tokyo (JP); Yoshiyuki Jin, Tokyo (JP); Akihiro Nabeshima, Tokyo (JP); Takeshi Yoneda, Tokyo (JP); Fumiya Sato, Tokyo (JP); Hiroshi Kusano, Tokyo (JP); Takumi Araki, Tokyo (JP); Shuntaro Miura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 42 days.

(21) Appl. No.: 18/709,318

(22) PCT Filed: Sep. 28, 2022

(86) PCT No.: PCT/JP2022/036239
§ 371 (c)(1),
(2) Date: May 10, 2024

(87) PCT Pub. No.: WO2024/069806
PCT Pub. Date: Apr. 4, 2024

(65) Prior Publication Data
US 2025/0042259 A1     Feb. 6, 2025

(51) Int. Cl.
B60L 15/20 (2006.01)
(52) U.S. Cl.
CPC .................................... B60L 15/20 (2013.01)
(58) Field of Classification Search
CPC ...................................................... B60L 15/20
(Continued)

(56) References Cited

U.S. PATENT DOCUMENTS 9,845,022 B2 * 12/2017 Komatsu ............. B60L 15/2018
9,902,272 B2 * 2/2018 Sawada ................... B60L 15/20
(Continued)

FOREIGN PATENT DOCUMENTS

JP     2002335602 A * 11/2002
JP     2005117718 A * 4/2005
(Continued)

OTHER PUBLICATIONS

Office Action dated Aug. 6, 2024, from corresponding Japan Patent Application No. 2023-571621, 7 pages.
(Continued)

*Primary Examiner* — Luis A Martinez Borrero
(74) *Attorney, Agent, or Firm* — Rimon P.C.

(57) ABSTRACT

A vehicle control apparatus includes a traveling motor and an accelerator operation part. The traveling motor is coupled to a wheel. The accelerator operation part is to be operated by a driver. The vehicle control apparatus includes a control system including a processor and a memory communicably coupled to each other. A control mode adapted to control the traveling motor includes a torque control mode of feedback-controlling a motor torque and a speed control mode of feedback-controlling a motor rotation speed. When a motor lock is detected, the control system detects an operation amount of the accelerator operation part and calculates a switching threshold by adding a predetermined amount to the operation amount. The control system switches the control mode to the speed control mode when: the accelerator operation part is further operated while the motor lock has continued; and the operation amount exceeds the switching threshold.

6 Claims, 10 Drawing Sheets

(58) Field of Classification Search
USPC .......................................................... 701/22
See application file for complete search history.

(56) References Cited

U.S. PATENT DOCUMENTS

| | | | | |
|---|---|---|---|---|
| 11,738,630 B2 * | 8/2023 | Toda | ..................... | B60W 40/08 |
| | | | | 180/65.51 |
| 12,233,891 B2 * | 2/2025 | Komuro | ................ | B60W 40/09 |
| 12,311,775 B2 * | 5/2025 | Ito | ............................. | B60L 3/12 |
| 2005/0263333 A1 * | 12/2005 | Fujiki | ................... | B60W 10/06 |
| | | | | 180/65.25 |
| 2010/0006358 A1 * | 1/2010 | Ishikawa | ............. | B60W 30/188 |
| | | | | 180/65.265 |
| 2016/0297418 A1 * | 10/2016 | Zhang | ................... | B60W 20/19 |
| 2016/0297419 A1 * | 10/2016 | Zhang | ................ | B60W 10/026 |
| 2018/0015840 A1 * | 1/2018 | Sawada | ..................... | B60L 7/14 |

| | | | | |
|---|---|---|---|---|
| 2022/0242251 A1 | 8/2022 | Oguro et al. | | |
| 2022/0379732 A1 * | 12/2022 | Nakamura | .......... | B60L 15/2018 |
| 2023/0256956 A1 * | 8/2023 | Oguro | ................... | B60W 10/08 |
| | | | | 701/22 |

FOREIGN PATENT DOCUMENTS

| | | | |
|---|---|---|---|
| JP | 2006-296135 A | 10/2006 |
| JP | 2012-046106 A | 3/2012 |
| JP | 2013-193557 A | 9/2013 |
| JP | 2015-211476 A | 11/2015 |
| JP | 2016-144245 A | 8/2016 |
| JP | 2022-116410 A | 8/2022 |

OTHER PUBLICATIONS

International Search Report issued in the International Application No. PCT/JP2022/036239 on Dec. 6, 2022, w/English Translation.

* cited by examiner

VEHICLE CONTROL APPARATUS

CROSS-REFERENCE TO RELATED APPLICATIONS

This application is the U.S. National Phase under 35 U.S.C. § 371 of International Application No. PCT/JP2022/036239, filed on Sep. 28, 2022.

TECHNICAL FIELD

The invention relates to a vehicle control apparatus to be mounted on a vehicle.

BACKGROUND ART

Vehicles including electric automobiles and hybrid vehicles are equipped with a traveling motor coupled to wheels (reference is made to Patent Literatures 1 to 3).

CITATION LIST

Patent Literature

Patent Literature 1: Japanese Unexamined Patent Application Publication No. 2015-211476
Patent Literature 2: Japanese Unexamined Patent Application Publication No. 2013-193557
Patent Literature 3: Japanese Unexamined Patent Application Publication No. 2016-144245

SUMMARY OF THE INVENTION

Problem to be Solved by the Invention

To travel over a level difference on a road surface from a stopped state or a traveling state at a very low speed, it is assumed that a driver gently depresses an accelerator pedal to gradually increase a motor torque of a traveling motor. At this time, rotation of the traveling motor is stopped until the motor torque is sufficiently increased to allow wheels to move over the level difference. The stopping of the rotation of the traveling motor causes continuous supply of electricity to a particular one or more of switching devices. Furthermore, the continuous supply of electricity to a particular one or more of switching devices results in excessively increasing a temperature of the switching device or temperatures of the switching devices. This causes a target motor torque to be limited from the viewpoint of suppressing an increase in the temperature. In this manner, if the motor torque is limited before the wheels move over the level difference from the viewpoint of protecting a component such as a switching device, it is difficult for the wheels to move over the level difference even when the traveling motor has a sufficient capability. There is a demand for improving such a situation.

It is an object of the invention to appropriately control a traveling motor in traveling over a level difference.

Means for Solving the Problem

A vehicle control apparatus according to an embodiment is a vehicle control apparatus to be mounted on a vehicle. The vehicle control apparatus includes a traveling motor, an accelerator operation part, and a control system. The traveling motor is coupled to a wheel. The accelerator operation part is to be operated by a driver. The control system includes a processor and a memory communicably coupled to each other. The control system is configured to control the traveling motor. A control mode adapted to control the traveling motor includes a torque control mode of feedback-controlling a motor torque and a speed control mode of feedback-controlling a motor rotation speed. The control system is configured to, when a motor lock is detected in which the rotation of the traveling motor controlled in a power running state is stopped, detect an operation amount of the accelerator operation part as a reference operation amount and calculate a switching threshold by adding a predetermined amount to the reference operation amount. The control system is configured to switch the control mode from the torque control mode to the speed control mode when: the accelerator operation part is further operated in a state in which the motor lock has continued; and the operation amount of the accelerator operation part exceeds the switching threshold.

Effects of the Invention

According to an aspect of the invention, the control system switches the control mode from the torque control mode to the speed control mode, when the operation amount of the accelerator operation part exceeds the switching threshold and the rotation of the traveling motor is stopped. This makes it possible to appropriately control the traveling motor in traveling over a level difference.

MODES FOR CARRYING OUT THE INVENTION

Figure 1:
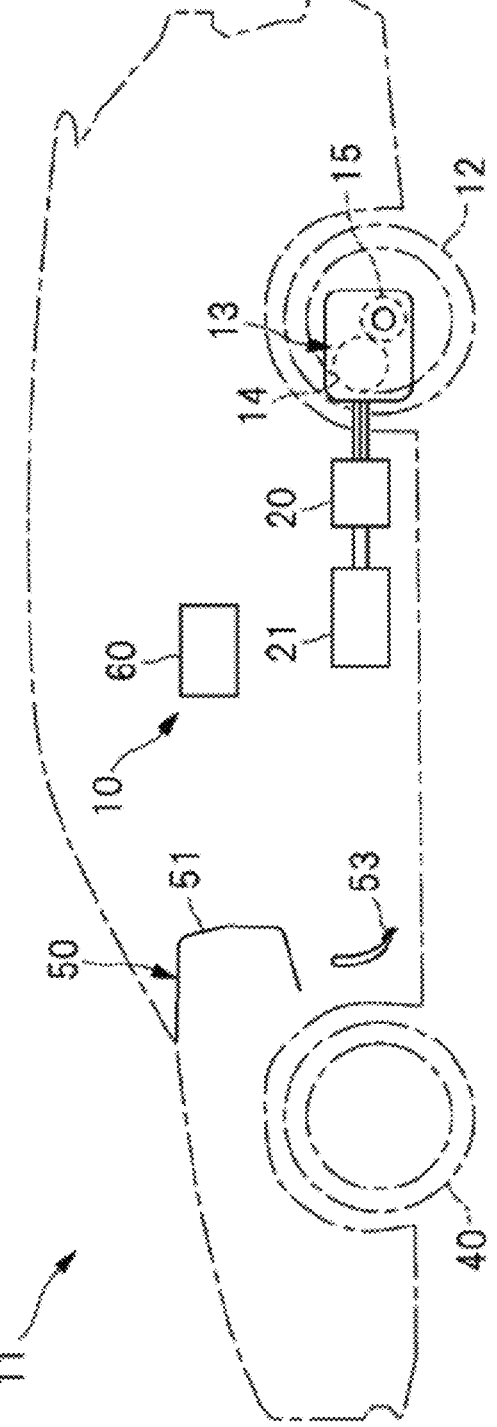
FIG. 1 is a diagram illustrating an example of a vehicle including a vehicle control apparatus according to one embodiment of the invention.

In the following, some embodiments of the invention are described in detail with reference to the drawings. Note that, in the following description, the same or substantially the same configurations and elements are denoted by the same reference numerals to avoid any redundant description.

[Configuration of Vehicle]

Figure 2:
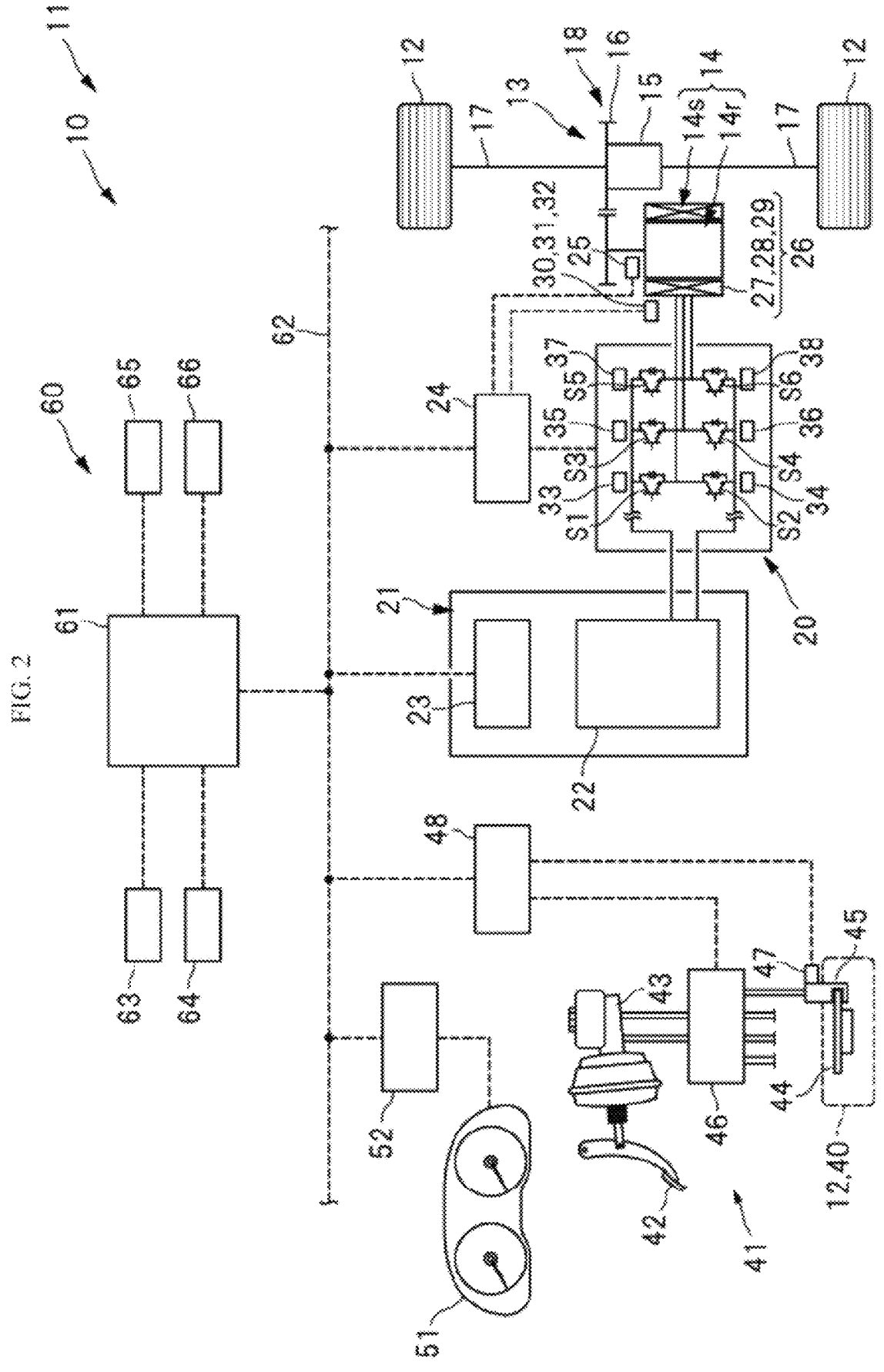
FIG. 2 is a diagram illustrating an example of the vehicle control apparatus.

FIG. 1 is a diagram illustrating an example of a vehicle 11 including a vehicle control apparatus 10 according to an embodiment of the invention. FIG. 2 is a diagram illustrating an example of the vehicle control apparatus 10. As illustrated in FIG. 1, the vehicle 11 is provided with an electric axle 13. The electric axle 13 drives rear wheels (wheels) 12. The electric axle 13 includes a traveling motor 14 and a differential mechanism 15. As illustrated in FIG. 2, the traveling motor 14 includes a rotor 14r. The rotor 14r is coupled to the differential mechanism 15 through a gear train 16. Furthermore, axle shafts 17 extend from the differential mechanism 15. The rear wheels 12 are coupled to the axle shafts 17. In this manner, the rear wheels 12 and the traveling motor 14 are coupled to each other through a power transmission path 18 including, for example, the gear train 16, the differential mechanism 15, and the axle shafts 17. Furthermore, the power transmission path 18, which couples the rear wheels 12 to the traveling motor 14, includes no sliding element such as a torque converter or a clutch. The sliding element permits rotation of the rear wheels 12 and the traveling motor 14 relative to each other.

The traveling motor 14 that is an electric motor is a synchronous motor in which the rotor 14r follows a rotating magnetic field of a stator 14s, that is, a synchronous motor in which the rotor 14r rotates at a synchronous speed. An inverter 20 is coupled to the stator 14s of the traveling motor 14. A battery pack 21 is coupled to the inverter 20. The battery pack 21 includes a battery module 22 and a battery control unit 23. The battery module 22 includes multiple battery cells. The battery control unit 23 monitors charging and discharging of the battery module 22. Furthermore, the inverter 20 includes multiple switching devices S1 to S6, and a motor control unit 24 is coupled to the inverter 20. The motor control unit 24 outputs control signals to these switching devices S1 to S6. The motor control unit 24 switches on and off the switching devices S1 to S6 by, for example, a PWM control to thereby generate the rotating magnetic field in the stator 14s and control a motor torque and a rotation speed of the traveling motor 14.

A rotation sensor 25 such as a resolver is coupled to the motor control unit 24. The rotation sensor 25 detects a rotation angle of the rotor 14r. Temperature sensors 30, 31, and 32 are also coupled to the motor control unit 24. The temperature sensors 30, 31, and 32 detect temperatures of a U-phase coil 27, a V-phase coil 28, and a W-phase coil 29 that configure a stator coil 26. Furthermore, temperature sensors 33, 34, 35, 36, 37, and 38 are coupled to the motor control unit 24. The temperature sensors 33, 34, 35, 36, 37, and 38 detect temperatures of the respective switching devices S1 to S6. Note that it is possible for the motor control unit 24 to calculate a rotation speed of the rotor 14r using detection signals from the rotation sensor 25.

The vehicle 11 is provided with a braking device 41 that puts a brake on front wheels 40 and the rear wheels 12. The braking device 41 includes a master cylinder 43 and calipers 45. The master cylinder 43 generates a brake fluid pressure in conjunction with a brake pedal 42. The calipers 45 put a brake on disc rotors 44 of the respective front wheels 40 and rear wheels 12. Furthermore, a brake actuator 46 is disposed between the master cylinder 43 and the calipers 45. The brake actuator 46 controls the brake fluid pressure to be supplied to each of the calipers 45. Furthermore, the calipers 45, which put a brake on the respective disc rotors 44, are each provided with a brake motor 47. The brake motor 47 drives a non-illustrated caliper piston. Thus, even when the brake pedal 42 is not depressed, it is possible to push the caliper piston out using the brake motor 47. This allows the caliper 45 to be actuated to put a brake on the disc rotor 44. Furthermore, a brake control unit 48 is coupled to the brake actuator 46 and the brake motors 47. The brake control unit 48 outputs control signals to the brake actuator 46 and the brake motors 47.

As illustrated in FIG. 1, an instrument panel 50 disposed at a front part of a vehicle compartment includes a meter display 51. The meter display 51 displays various kinds of information to a driver. As illustrated in FIG. 2, a meter control unit 52 is coupled to the meter display 51. The meter control unit 52 controls contents to be displayed on the meter display 51. Furthermore, as illustrated in FIG. 1, an accelerator pedal (accelerator operation part) 53 to be operated by the driver is disposed below the instrument panel 50.

[Control System]

As illustrated in FIG. 2, the vehicle 11 is provided with a control system 60. The control system 60 includes multiple electronic control units to control, for example, the electric axle 13 and the braking device 41. The electronic control units configuring the control system 60 include the battery control unit 23, the motor control unit 24, the brake control unit 48, and the meter control unit 52, which are described above. The electronic control units configuring the control system 60 also include a vehicle control unit 61. The vehicle control unit 61 outputs control signals to the control units 23, 24, 48, and 52. These control units 23, 24, 48, 52, and 61 are communicably coupled to each other via an in-vehicle network 62 such as a CAN.

The vehicle control unit 61 sets operation targets of, for example, the electric axle 13 and the braking device 41, based on inputted information from various control units and various sensors to be described later. Thereafter, the vehicle control unit 61 generates control signals corresponding to the operation targets of, for example, the electric axle 13 and the braking device 41. The vehicle control unit 61 outputs these control signals to the motor control unit 24, the brake control unit 48, and other control units. The sensors coupled to the vehicle control unit 61 include a vehicle speed sensor 63, an accelerator sensor 64, and a brake sensor 65. The vehicle speed sensor 63 detects a vehicle speed, that is, a traveling speed of the vehicle 11. The accelerator sensor 64 detects an operation amount of the accelerator pedal 53. The brake sensor 65 detects an operation amount of the brake pedal 42. Additionally, a start switch 66 is coupled to the vehicle control unit 61. The start switch 66 is operated by the driver to start up the control system 60.

Figure 3:
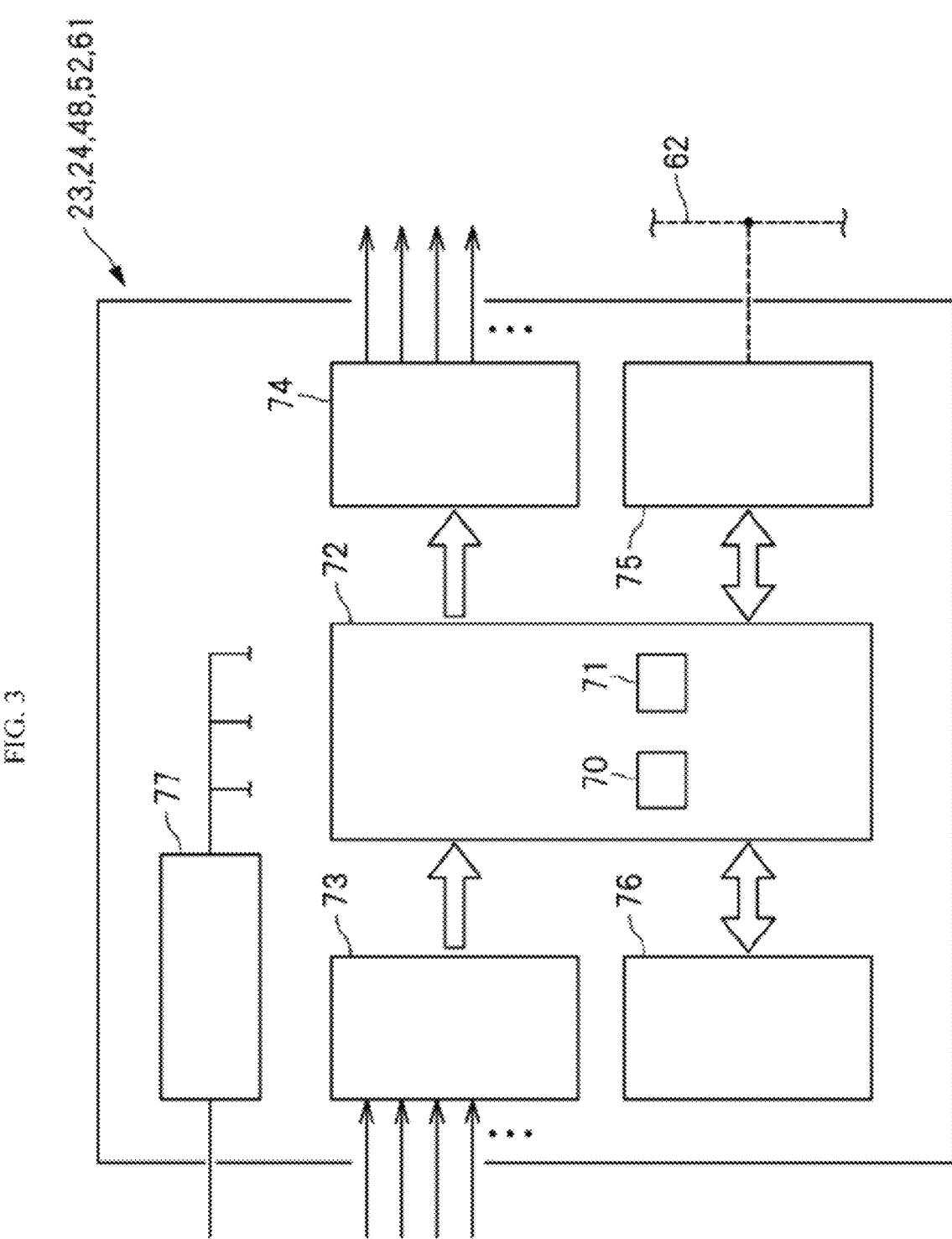
FIG. 3 is a diagram illustrating an example of a basic configuration of control units.

FIG. 3 is a diagram illustrating an example of a basic configuration of the control units 23, 24, 48, 52, and 61. As illustrated in FIG. 3, the control units that are electronic control units each include a microcontroller 72. The microcontroller 72 includes, for example, a processor 70 and a main memory (memory) 71. The main memory 71 holds a predetermined program. The program is to be executed by the processor 70. The processor 70 and the main memory 71 are communicably coupled to each other. Note that the microcontroller 72 may include multiple processors 70, and the microcontroller 72 may include multiple main memories 71.

Additionally, the control units each include, for example, an input circuit 73, a drive circuit 74, a communication circuit 75, an external memory 76, and a power supply circuit 77. The input circuit 73 converts signals received from various sensors into signals receivable by the microcontroller 72. The drive circuit 74 generates drive signals for various devices including the inverter 20 and the braking device 41, which are described above, based on signals outputted from the microcontroller 72. The communication circuit 75 converts the signals outputted from the microcontroller 72 into communication signals for other control units.

The communication circuit 75 also converts communication signals received from the other control units into signals receivable by the microcontroller 72. Furthermore, the power supply circuit 77 supplies a stable power supply voltage to, for example, the microcontroller 72, the input circuit 73, the drive circuit 74, the communication circuit 75, and the external memory 76. Additionally, the external memory 76 includes, for example, a nonvolatile memory and holds programs and various pieces of data, for example.

[Requested Driving Force]

Figure 4:
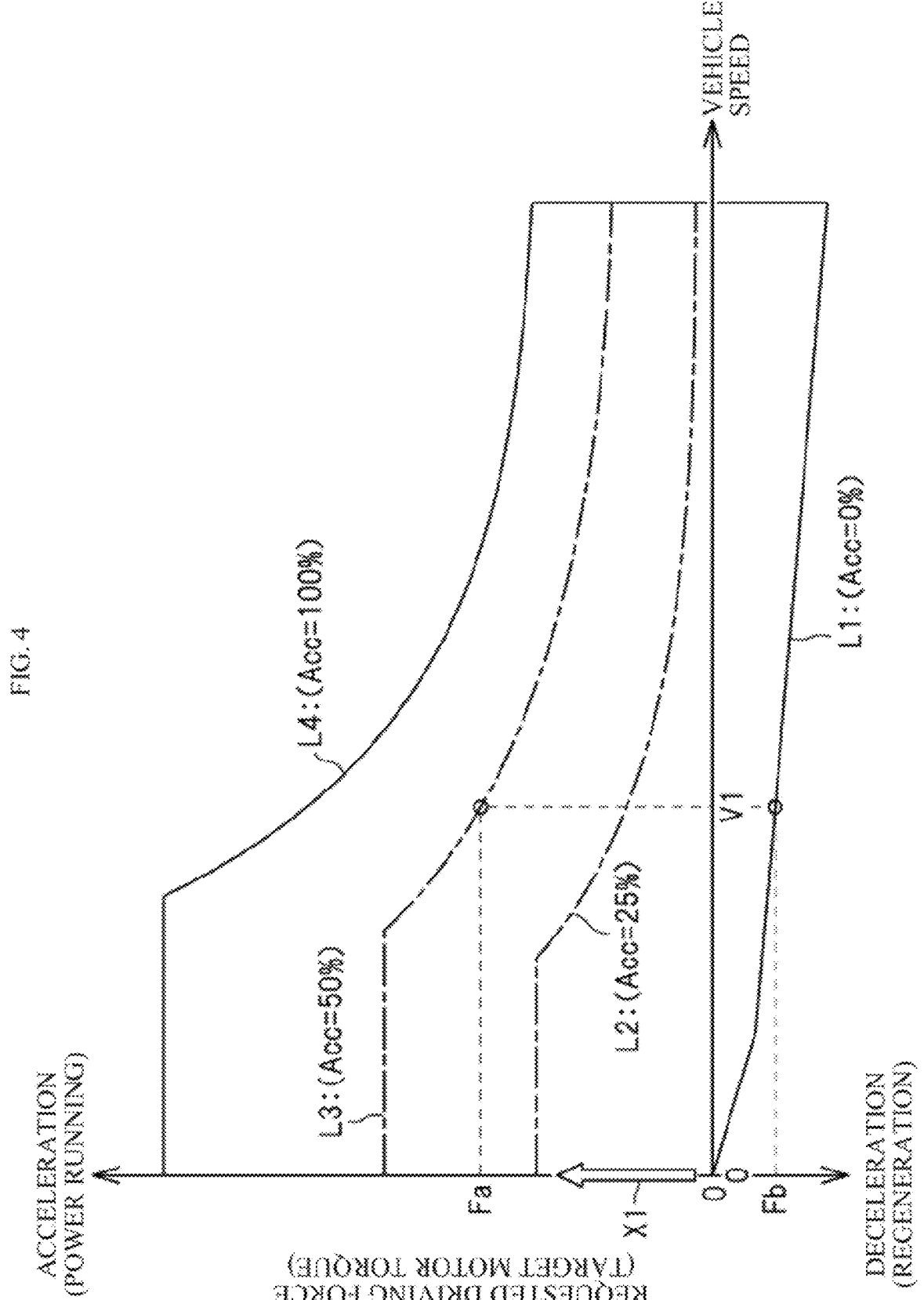
FIG. 4 is a graph illustrating an example of a driving force map.

FIG. 4 is a graph illustrating an example of a driving force map. As illustrated in FIG. 4, the driving force map gives characteristic lines L1 to L4 defining a requested driving force per operation amount (hereinafter, referred to as an accelerator position) of the accelerator pedal 53. That is, the vehicle control unit 61 sets a requested driving force for the vehicle 11 in accordance with the characteristic line L1 when an accelerator position Acc is 0% and sets a requested driving force for the vehicle 11 in accordance with the characteristic line L2 when the accelerator position Acc is 25%. Furthermore, the vehicle control unit 61 sets a requested driving force for the vehicle 11 in accordance with the characteristic line L3 when the accelerator position Acc is 50% and sets a requested driving force for the vehicle 11 in accordance with the characteristic line L4 when the accelerator position Acc is 100%.

For example, in a situation in which the vehicle speed is "V1", when the accelerator pedal 53 is depressed so that the accelerator position Acc becomes "50%", the vehicle control unit 61 sets the requested driving force to "Fa". Furthermore, in the situation in which the vehicle speed is "V1", when the depression of the accelerator pedal 53 is released so that the accelerator position Acc becomes "0%", the vehicle control unit 61 sets the requested driving force to "Fb". Thereafter, the vehicle control unit 61 sets a target motor torque of the traveling motor 14 to a power running side or a regenerative side so that the requested driving force that has been set is achieved.

That is, when the requested driving force is set to an acceleration side by depression of the accelerator pedal 53, the target motor torque of the traveling motor 14 is set to the power running side, so that the traveling motor 14 is controlled to be in a power running state. In contrast, when the requested driving force is set to a deceleration side by releasing the depression of the accelerator pedal 53, the target motor torque of the traveling motor 14 is set to the regenerative side, so that the traveling motor 14 is controlled to be in a regenerative state. Note that, although the driving force map illustrated in FIG. 4 gives the four characteristic lines L1 to L4 from the viewpoint of facilitating the description, the driving force map is not limited to this configuration. It is needless to say that the driving force map may give five or more characteristic lines.

[Level-Difference Travel Control]

Figure 5:
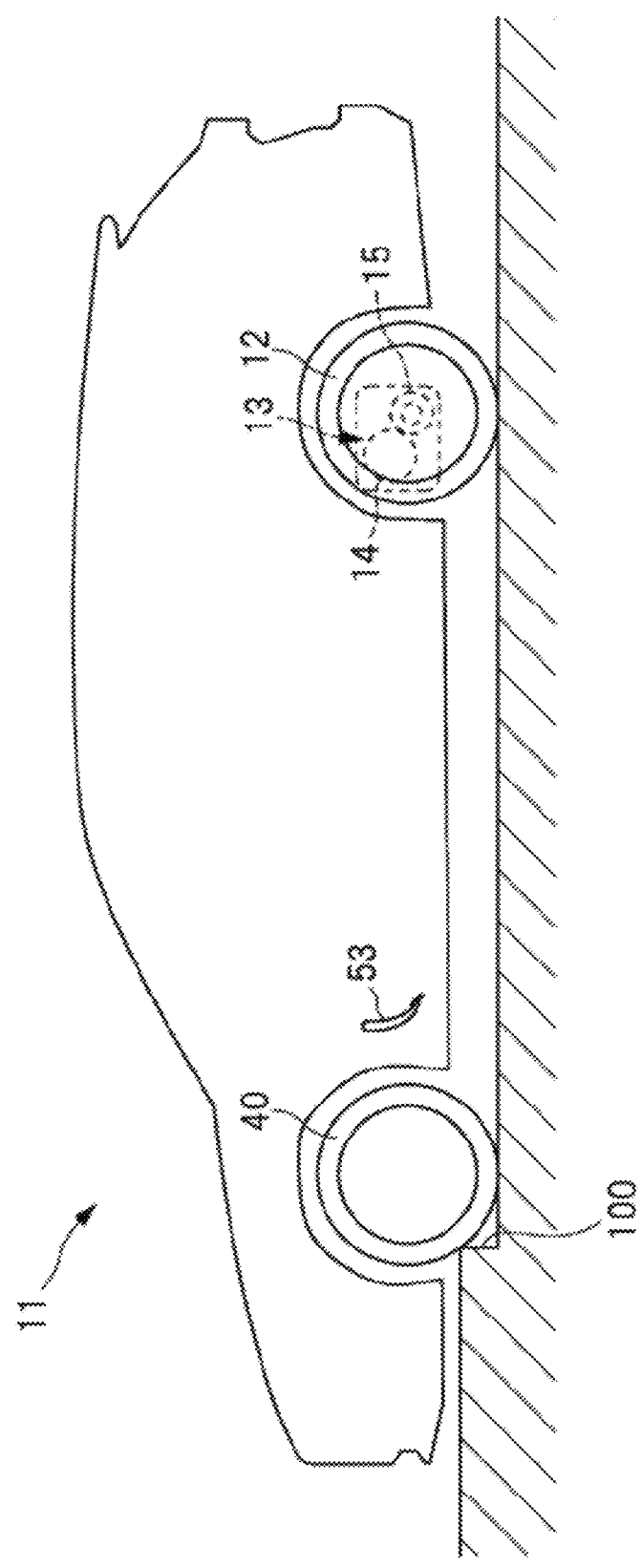
FIG. 5 is a diagram illustrating a situation in which the vehicle has reached a level difference.
Figure 6:
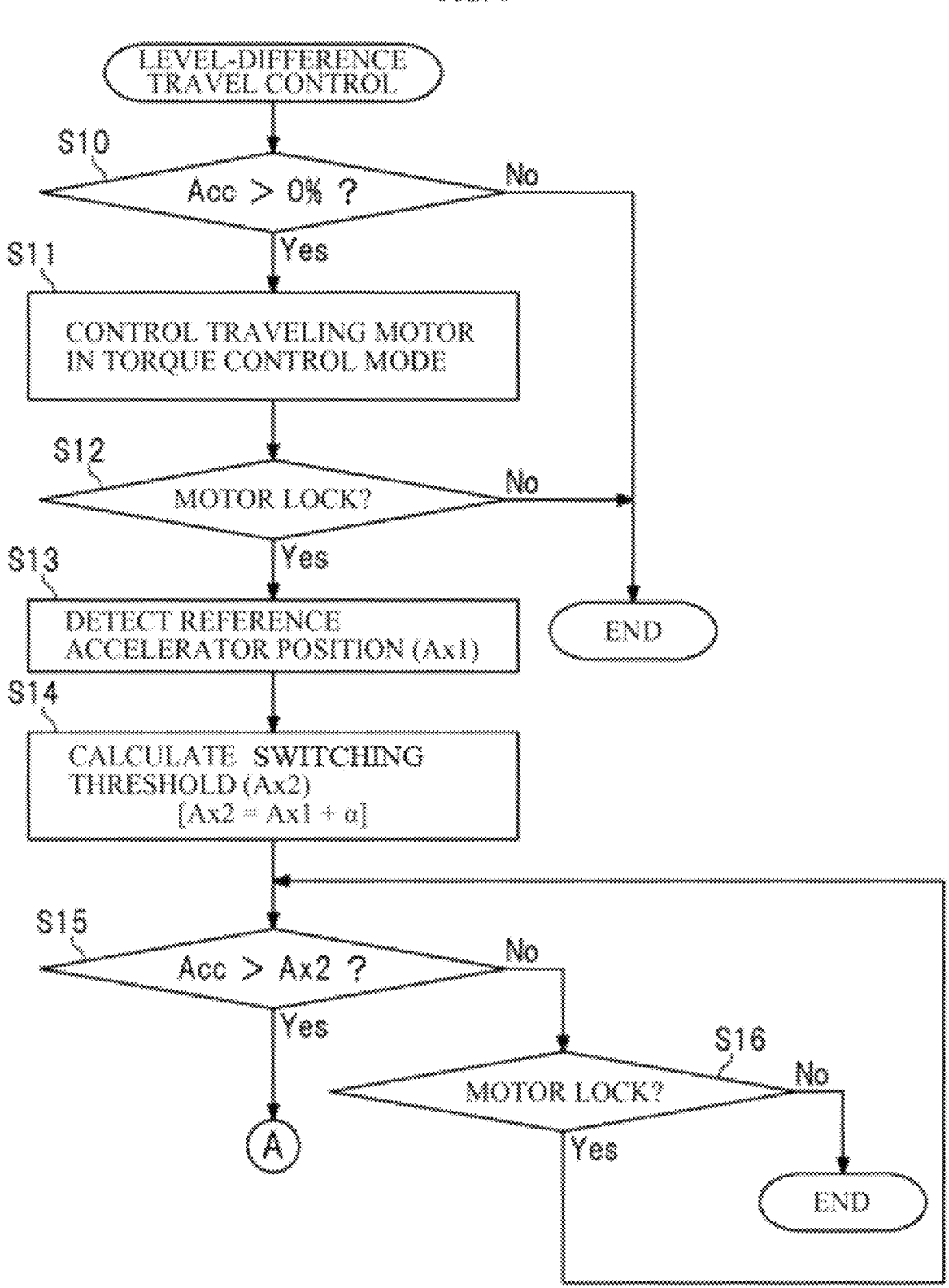
FIG. 6 is a flowchart illustrating an example of a procedure for executing a level-difference travel control.
Figure 7:
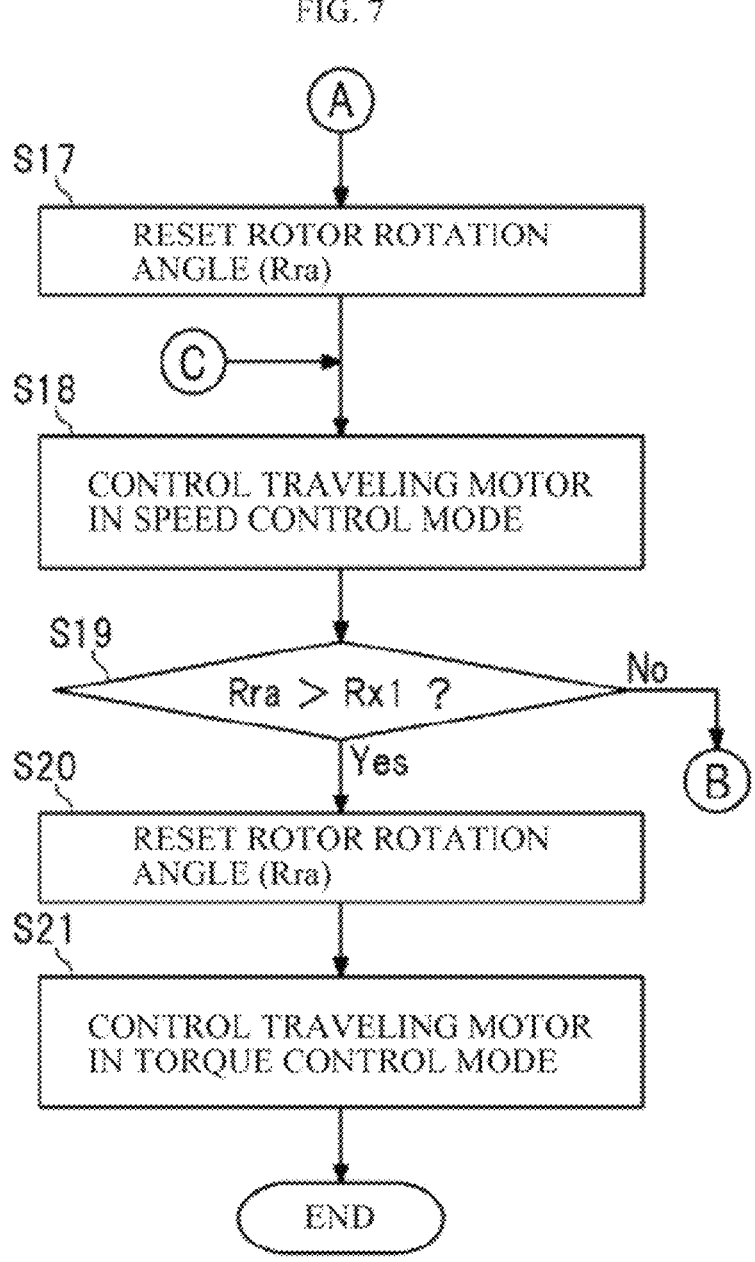
FIG. 7 is a flowchart illustrating the example of the procedure for executing the level-difference travel control.
Figure 8:
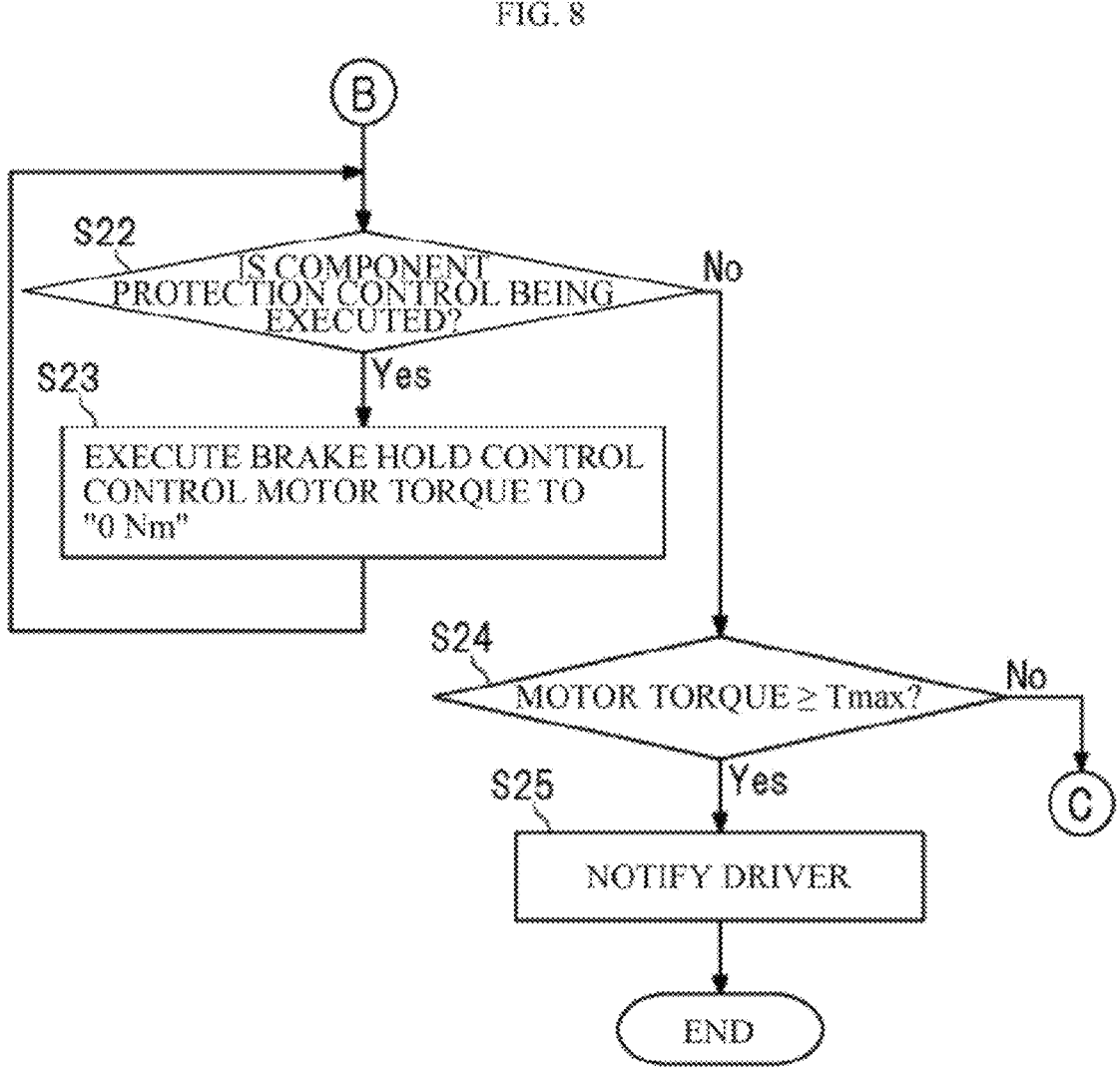
FIG. 8 is a flowchart illustrating the example of the procedure for executing the level-difference travel control.

Next, a level-difference travel control executed by the control system 60 will be described. Here, FIG. 5 is a diagram illustrating a situation in which the vehicle 11 has reached a level difference 100. FIGS. 6 to 8 are flowcharts illustrating an example of a procedure for executing the level-difference travel control. Note that flowcharts in FIGS. 6 to 8 are coupled to each other at positions of reference signs A, B, and C. Each step of the level-difference travel control illustrated in FIGS. 6 to 8 indicates a process performed by the processors 70, which configure the control system 60. Furthermore, the level-difference travel control illustrated in FIGS. 6 to 8 is a control executed by the control system 60 per predetermined cycle after the control system 60 is started up.

As illustrated in FIG. 5, a situation in which the level-difference travel control is executed refers to a situation in which the accelerator pedal 53 is gently depressed by the driver to travel over the level difference 100 ahead of the vehicle from a stopped state or a traveling state at a very low speed. That is, the situation in which the level-difference travel control is executed refers to a situation in which, as indicated by arrow X1 in FIG. 4, the requested driving force and the target motor torque are gradually increased in response to the driver gently depressing the accelerator pedal 53. As illustrated in FIG. 5, to travel over the level difference 100 by rotating the rear wheels 12, the motor torque of the traveling motor 14 is to be increased to a predetermined value or higher. However, the driver typically further depresses the accelerator pedal 53 gradually to prevent the vehicle 11 from dashing forward due to a rapid increase in a torque.

In traveling over the level difference 100 by gradually depressing the accelerator pedal 53 further in this manner, it is assumed that the rotation of the traveling motor 14 that is controlled in the power running state is stopped, causing the target motor torque to be limited by an intervention of a component protection control. That is, the rotation of the traveling motor 14 is stopped until the motor torque is sufficiently increased to allow the front wheels 40 to move over the level difference 100. The stopping of the rotation of the traveling motor 14 causes continuous supply of electricity to a particular one or more of the coils 27 to 29 or a particular one or more of the switching devices S1 to S6. Furthermore, the continuous supply of electricity to the particular one or more of the coils 27 to 29 or the particular one or more of the switching devices S1 to S6 results in excessively increasing a temperature of the particular one or more of the coils 27 to 29 or the switching devices S1 to S6. This causes the target motor torque to be limited by an intervention of the component protection control.

That is, if a temperature of any of the coils 27 to 29 exceeds a predetermined upper limit value, or if a temperature of any of the switching devices S1 to S6 exceeds a predetermined upper limit value, the component protection control limits the target motor torque to suppress a flowing electric current to the stator coil 26 and the inverter 20. In this manner, if the target motor torque is limited by the intervention of the component protection control, it is difficult to obtain a motor torque used to travel over the level difference 100. Thus, it is difficult to travel over the level difference 100 even when the traveling motor 14 has a sufficient capability. Given the circumstances, the control system 60 executes the following level-difference travel control to cause the traveling motor 14 to rotate while avoiding the intervention of the component protection control, making it possible to travel over the level difference 100.

<Level-Difference Travel Control: Flowchart>

As illustrated in FIG. 6, in step S10, it is determined whether the accelerator position Acc is greater than 0%, that is, whether the accelerator pedal 53 is operated. In step S10, if it is determined that the accelerator pedal 53 is operated, the flow proceeds to step S11, and the traveling motor 14 is controlled in a torque control mode. Here, one of control modes that control the traveling motor 14 is the torque control mode. The torque control mode controls a motor torque of the traveling motor 14 toward the target motor torque, that is, feedback controls the motor torque. The torque control mode sets, for example, the target motor torque based on the accelerator position using the driving force map illustrated in FIG. 4 and controls the motor torque of the traveling motor 14 toward the target motor torque. Note that the flowing electric current of the stator coil 26 is given to the control system 60 as feedback in order to feedback control the motor torque. The control system 60 controls the inverter 20 to converge the flowing electric current to a current value corresponding to the target motor torque.

When the traveling motor 14 is controlled in the torque control mode, the flow proceeds to step S12, and it is determined whether a motor lock has occurred on the traveling motor 14. The motor lock refers to a state in which rotation of the traveling motor 14 controlled to be in the power running state is stopped, that is, a state in which the rotor 14r is stopped while electricity is supplied to the stator coil 26. When the vehicle 11 travels over the level difference 100 as illustrated in FIG. 5, the motor lock may possibly occur on the traveling motor 14. Note that in step S12, for example, it is determined that the motor lock has occurred in a case where a situation in which the accelerator position Acc is greater than 0%, and the rotation of the rotor 14r is stopped continues for a predetermined period of time. Alternatively, in step S12, it may be determined that the motor lock has occurred in a case where a situation in which the electricity is supplied to the stator coil 26, and the rotation of the rotor 14r is stopped continues for a predetermined period of time.

In step S12, if the motor lock is detected, the flow proceeds to step S13. In step S13, the accelerator position Acc at the point in time at which the motor lock has been detected is detected as a reference accelerator position (reference operation amount) Ax1. That is, the reference accelerator position Ax1 is an accelerator position Acc at the point in time when the motor lock has been detected. Thereafter, in step S14, a switching threshold Ax2 (Ax2=Ax1+α) is calculated by adding a predetermined value (predetermined amount) α to the reference accelerator position Ax1. In subsequent step S15, it is determined whether a current accelerator position Acc exceeds the switching threshold Ax2.

In step S15, if it is determined that the current accelerator position Acc is less than or equal to the switching threshold Ax2, that is, if the accelerator pedal 53 is not further depressed exceeding the predetermined value α from the point in time when the motor lock has been detected, the flow proceeds to step S16. In step S16, it is determined whether the motor lock has continued. If it is determined that the motor lock has not continued in step S16, the vehicle 11 is not in a situation of traveling over the level difference 100. Thus, the procedure exits the routine while maintaining the torque control mode. If it is determined that the motor lock has continued in step S16, it is assumed that the vehicle 11 is in a situation of traveling over the level difference 100. Thus, the flow proceeds to step S15, and it is determined again whether the current accelerator position Acc exceeds the switching threshold Ax2.

In step S15, if it is determined that the current accelerator position Acc exceeds the switching threshold Ax2, that is, if the accelerator pedal 53 is further depressed exceeding the predetermined value α from the point in time when the motor lock has been detected, the driver is operating the accelerator pedal in order to travel over the level difference 100. Thus, the flow proceeds to step S17. As illustrated in FIG. 7, in step S17, the rotation angle of the traveling motor 14, that is, a rotation angle (hereinafter, referred to as a rotor rotation angle) Rra of the rotor 14r is reset. In subsequent step S18, the traveling motor 14 is controlled in a speed control mode. In other words, as indicated in steps S15 and S17, if the accelerator position Acc exceeds the switching threshold Ax2, the control mode of the traveling motor 14 is switched from the torque control mode to the speed control mode.

Here, one of the control modes that control the traveling motor 14 is the speed control mode. The speed control mode controls the rotation speed of the rotor 14r toward a predetermined target rotation speed (for example, 100 rpm), that is, feedback controls the rotation speed (a motor rotation speed) of the rotor 14r. The speed control mode gives the rotation speed of the rotor 14r (hereinafter, referred to as a rotor rotation speed) to the control system 60 as feedback. The control system 60 controls the inverter 20 to converge the rotor rotation speed to the target rotation speed. Note that the target rotation speed used in the speed control mode may be a fixed value or a variable value that varies in accordance with, for example, the accelerator position.

As described above, if the accelerator pedal 53 is further depressed exceeding the predetermined value α from the point in time when the motor lock has been detected, in step S18, the control mode of the traveling motor 14 is switched from the torque control mode to the speed control mode. Accordingly, the traveling motor 14 is controlled toward the target rotation speed (for example, 100 rpm). Thus, even if the motor lock occurs, and the accelerator position Acc is maintained, the motor torque is increased in accordance with a difference between the target rotation speed and the rotor rotation speed. Accordingly, it is possible to increase the motor torque without the driver further depressing the accelerator pedal 53. This allows the traveling motor 14 to rotate so that the vehicle 11 travels over the level difference 100. Additionally, it is possible to rotate the rotating magnetic field of the stator 14s in accordance with the rotation of the rotor 14r. Thus, no electricity is continuously supplied to a particular one of, for example, the switching devices S1 to S6, making it possible to suppress intervention of the above-described component protection control.

Thereafter, in step S19, it is determined whether the rotor rotation angle Rra exceeds a predetermined angle threshold Rx1. If the rotor rotation angle Rra exceeds the angle threshold Rx1 in step S19, it is a situation in which the front wheels 40 have moved over the level difference 100 by the rotation of the traveling motor 14. Thus, the flow proceeds to step S20, and the rotor rotation angle Rra is reset. Thereafter, the flow proceeds to step S21, and the control mode of the traveling motor 14 is switched from the speed control mode to the torque control mode. In this manner, it is possible to control the traveling motor 14 in accordance with the accelerator position Acc after the front wheels 40 have moved over the level difference 100 by switching the control mode of the traveling motor 14 to the torque control mode. This makes it possible to allow the vehicle 11 to travel without causing the driver to feel uncomfortable.

In step S19, if it is determined that the rotor rotation angle Rra is less than or equal to the angle threshold Rx1, it is a situation in which the traveling motor 14 has not sufficiently rotated, that is, a situation in which the front wheels 40 have not moved over the level difference 100. Thus, as illustrated in FIG. 8, the flow proceeds to step S22, and it is determined whether the component protection control is being executed that limits the target motor torque. In step S22, if it is determined that the component protection control is being executed, the flow proceeds to step S23 to cancel the component protection control. In step S23, a brake hold control is executed that pushes the caliper piston out using the brake motor 47. Additionally, the motor torque of the traveling motor 14 is controlled to "0 Nm".

In this manner, controlling the motor torque of the traveling motor 14 to "0 Nm" shuts off the supply of electricity to the inverter 20 and the stator coil 26. This makes it possible to lower the temperature of the inverter 20 and the stator coil 26, thereby cancelling the component protection control. Moreover, even when the motor torque of the traveling motor 14 is controlled to "0 Nm", it is possible to prevent movement of the vehicle by the brake hold control. Thereafter, in step S23, upon controlling the motor torque to "0 Nm", the flow proceeds to step S22 again, and it is determined whether the component protection control is being executed.

In step S22, if it is determined that the component protection control is not being executed, the flow proceeds to step S24, and it is determined whether the motor torque of the traveling motor 14 has reached a predetermined upper limit value Tmax. In step S24, if the motor torque has reached the upper limit value Tmax, it is difficult to travel over the level difference 100 using the traveling motor 14. Thus, the flow proceeds to step S25, and contents including, for example, that it is difficult to travel over the level difference 100 are displayed on the meter display 51 for the driver. Note that if it is determined, in step S22, that the component protection control is not being executed and also, in step S24, that the motor torque has not reached the upper limit value Tmax, the flow proceeds to step S18 as illustrated in FIG. 7. In step S18, the control of the traveling motor 14 in the speed control mode is continued.

<Level-Difference Travel Control: Timing Chart>

Figure 9:
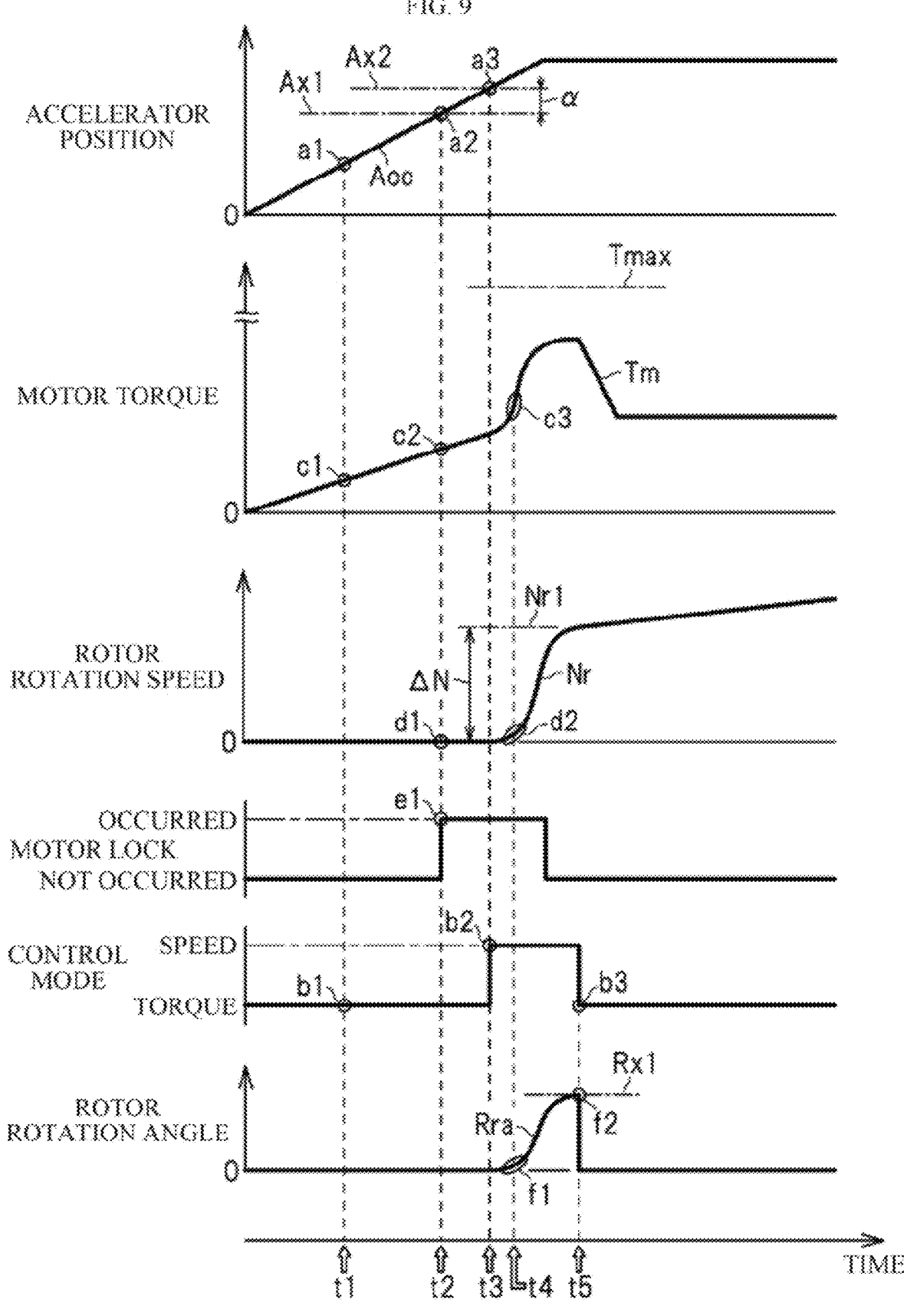
FIG. 9 is a timing chart illustrating an example of how the level-difference travel control is executed.
Figure 10:
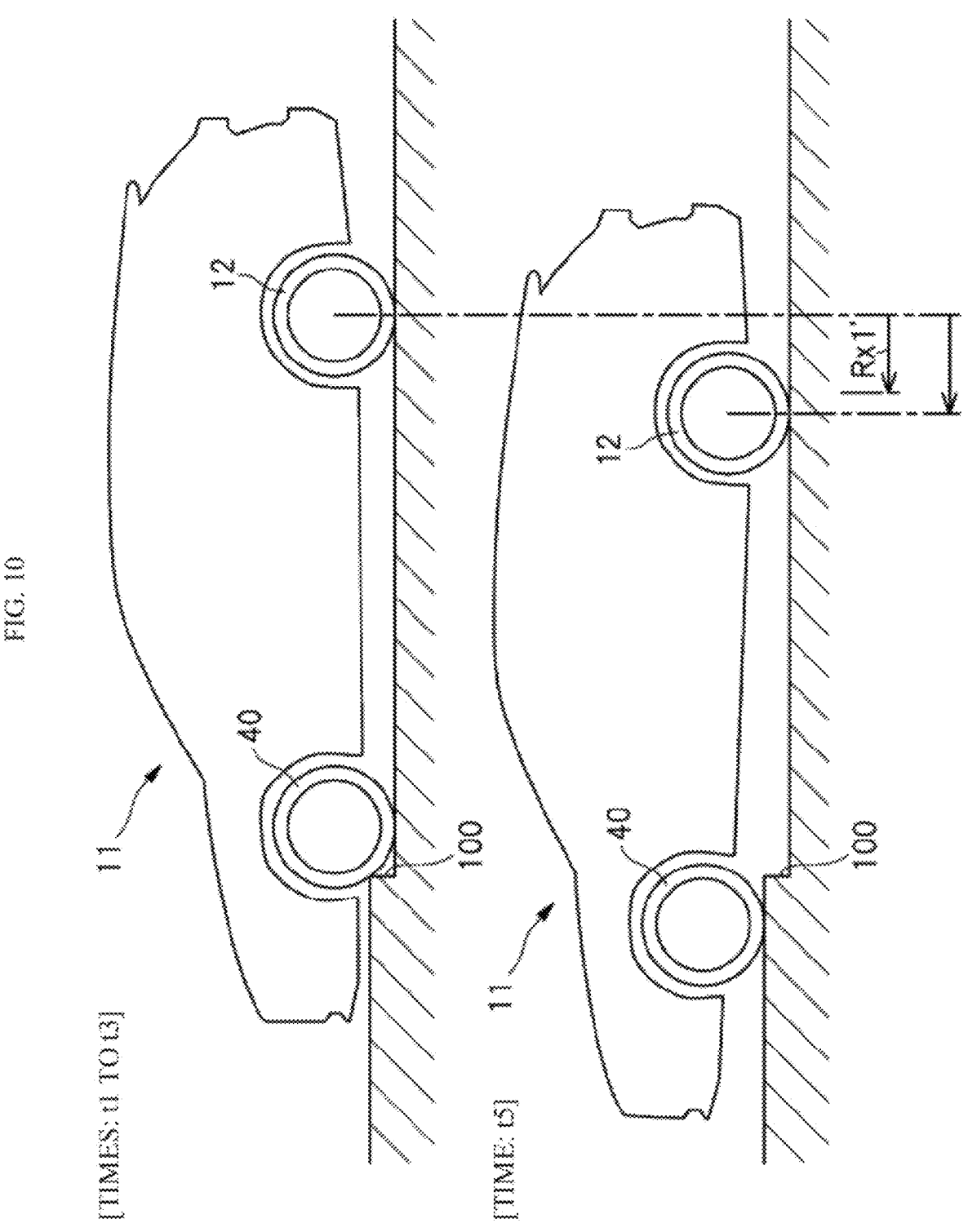
FIG. 10 is a diagram illustrating an example of a traveling situation of the vehicle during the level-difference travel control.

Next, the level-difference travel control described above will be described with reference to a timing chart. FIG. 9 is the timing chart illustrating an example of how the level-difference travel control is executed. FIG. 10 is a diagram illustrating an example of a traveling situation of the vehicle 11 during the level-difference travel control. Note that FIG. 10 illustrates the vehicle 11 corresponding to times t1 to t3 in FIG. 9 and the vehicle 11 corresponding to a time t5 in FIG. 9. Furthermore, a distance Rx1' indicated in FIG. 10 is a distance by which the rear wheels 12 has moved when the rotor rotation angle Rra reaches the angle threshold Rx1. Furthermore, the timing chart illustrated in FIG. 9 indicates a situation from a state in which the vehicle 11 has reached the level difference 100 and stopped, and the accelerator pedal 53 is gradually depressed, until thereafter the front wheels 40 of the vehicle 11 move over the level difference 100.

As illustrated in FIG. 9, at the time t1, the driver gradually depresses the accelerator pedal 53, and the accelerator position Acc is gradually increased (reference sign a1). At this time, because the traveling motor 14 is controlled in the torque control mode (reference sign b1), a motor torque Tm of the traveling motor 14 increases in accordance with the accelerator position Acc (reference sign c1). Thereafter, at the time t2, the traveling motor 14 is controlled in the power running state (reference sign c2), and the situation in which a rotor rotation speed Nr is "0 rpm" (reference sign d1) has continued for a predetermined time. Thus, it is determined that the motor lock has occurred (reference sign e1).

In this manner, upon detecting the motor lock (reference sign e1), the accelerator position Acc at the point in time of detection is detected as the reference accelerator position Ax1 (reference sign a2), and the switching threshold Ax2 is calculated by adding the predetermined value α to the reference accelerator position Ax1. Thereafter, as indicated at the time t3, if the accelerator position Acc exceeds the switching threshold Ax2 (reference sign a3), the control mode of the traveling motor 14 is switched from the torque control mode to the speed control mode (reference sign b2). Accordingly, as indicated at a time t4, the motor torque is increased (reference sign c3) based on a difference ΔN between a target rotation speed Nr1 and the rotor rotation speed Nr. Additionally, increasing the motor torque (reference sign c3) gradually increases the rotor rotation speed Nr and the rotor rotation angle Rra (reference signs d2 and f1).

Thereafter, as indicated at the time t5, if the rotor rotation angle Rra exceeds the predetermined angle threshold Rx1 (reference sign f2), the control mode of the traveling motor 14 is switched from the speed control mode to the torque control mode (reference sign b3). That is, a situation in which the rotor rotation angle Rra exceeds the angle threshold Rx1 refers to a state in which the front wheels 40 have moved over the level difference 100 as indicated in FIG. 10 at the time t5. In this manner, using the torque control mode after the front wheels 40 have moved over the level difference 100 allows the traveling motor 14 to be controlled in accordance with the target motor torque corresponding to the accelerator position Acc. Note that when the rear wheels 12 stop at the level difference 100, and the motor lock of the traveling motor 14 is detected again, the traveling motor 14 is controlled using the speed control mode again. Furthermore, as illustrated in FIG. 9, when the rotor rotation angle Rra exceeds the angle threshold Rx1, the rotor rotation angle Rra is reset to "0°".

As described so far, if the accelerator position Acc exceeds the switching threshold Ax2 (reference sign a3) in the state in which the motor lock of the traveling motor 14 has occurred, the control mode of the traveling motor 14 is switched from the torque control mode to the speed control mode (reference sign b2). This allows the motor torque to be increased based on the difference ΔN between the target rotation speed Nr1 and the rotor rotation speed Nr (reference sign c3), thereby allowing the traveling motor 14 to rotate so that the vehicle 11 travels over the level difference 100. That is, because the power transmission path 18, which couples the rear wheels 12 to the traveling motor 14, includes no sliding element such as a torque converter, the motor lock may possibly occur when the vehicle 11 travels over the level difference 100. In this case also, it is possible to appropriately rotate the traveling motor 14. Furthermore, in the speed control mode of the present embodiment, for example, an integral term in a proportional-integral control is set to be large to promptly increase the motor torque in accordance with the difference ΔN between the target rotation speed Nr1 and the rotor rotation speed Nr. Specifically, the speed control mode, which is one of the control modes, is performed not only in the level-difference travel control but also in a slip control when wheels spin. The integral term in the speed control mode in the level-difference travel control is set to be larger than the integral term in the speed control mode in the slip control.

It is needless to say that the invention is not limited to the above-described embodiments and may be modified in various forms without departing from the scope of the invention. In the above description, the control system 60 includes the multiple control units 23, 24, 48, 52, and 61. However, this is non-limiting. For example, the control system 60 may be configured by one control unit. Note that the vehicle 11 is not limited to the electric automobile as illustrated in the drawings and may be a fuel cell vehicle or a series hybrid vehicle. Furthermore, in the above description, the rear wheels 12 are driven by the electric axle 13. However, this is non-limiting.

The front wheels 40 may be driven by an electric axle, or the front wheels 40 and the rear wheels 12 may both be driven by two electric axles. Furthermore, each of the rear wheels 12 may be provided with a traveling motor, each of the front wheels 40 may be provided with a traveling motor, or each of the front wheels 40 and each of the rear wheels 12 may be provided with a traveling motor. Furthermore, in the above description, the accelerator pedal 53 is used as the accelerator operation part. However, this is non-limiting. The accelerator operation part may be a lever to be manually operated by the driver.

DESCRIPTION OF REFERENCE NUMERALS

10 Vehicle control apparatus
11 Vehicle
12 Rear wheels (wheels)
14 Traveling motor (synchronous motor)
14$r$ Rotor
18 Power transmission path
53 Accelerator pedal (accelerator operation part)
60 Control system
70 Processor
71 Main memory (memory)
Tm Motor torque
Nr Rotation speed (motor rotation speed)
Acc Accelerator position (operation amount)
Ax1 Reference accelerator position (reference operation amount)
Ax2 Switching threshold
α Predetermined value (predetermined amount)
Rra Rotation angle
Rx1 Angle threshold

The invention claimed is:

1. A vehicle control apparatus to be mounted on a vehicle, the vehicle control apparatus comprising:

a traveling motor coupled to a wheel;

an accelerator operation part to be operated by a driver; and a control system comprising a processor and a memory communicably coupled to each other, the control system controlling the traveling motor, wherein a control mode adapted to control the traveling motor comprises a torque control mode of feedback-controlling a motor torque and a speed control mode of feedback-controlling a motor rotation speed, and the control system is configured to;

when a motor lock is detected in which the rotation of the traveling motor controlled in a power running state is stopped, detect an operation amount of the accelerator operation part as a reference operation amount and calculate a switching threshold by adding a predetermined amount to the reference operation amount; and switch the control mode from the torque control mode to the speed control mode when: the accelerator operation part is further operated in a state in which the motor lock has continued; and the operation amount of the accelerator operation part exceeds the switching threshold wherein the control system is configured to:

when the operation amount of the accelerator operation part exceeds the switching threshold and the rotation of the traveling motor is stopped, switch the control mode from the torque control mode to the speed control mode; and when a rotation angle of the traveling motor exceeds an angle threshold after the control mode is switched from the torque control mode to the speed control mode, switch the control mode from the speed control mode to the torque control mode.

2. The vehicle control apparatus according to claim 1, wherein a power transmission path that couples the wheel and the traveling motor to each other comprises no sliding element that permits rotation of the wheel and the traveling motor relative to each other.

3. The vehicle control apparatus according to claim 1, wherein the traveling motor comprises a synchronous motor configured to rotate a rotor at a synchronous speed.

4. A vehicle control apparatus to be mounted on a vehicle, the vehicle control apparatus comprising:

a traveling motor coupled to a wheel;

an accelerator operation part to be operated by a driver; and a control system comprising a processor and a memory communicably coupled to each other, the control system controlling the traveling motor, wherein the control system is configured to:

control the traveling motor in a torque control mode that feedback-controls a motor torque toward a target motor torque based on an operation amount of the accelerator operation part;

detect occurrence of a motor-lock state in which rotation of the traveling motor controlled in the torque control mode and in a power-running state is stopped;

store an operation amount of the accelerator operation part at a time of detecting the motor-lock state as a reference operation amount and calculate a switching threshold by adding a predetermined offset amount to the reference operation amount;

continue to monitor persistence of the motor-lock state and, when the accelerator operation part is further operated while the motor-lock state continues and the operation amount exceeds the switching threshold, switch a control mode of the traveling motor from the torque control mode to a speed control mode; and execute the speed control mode to feedback-control a rotation speed of the traveling motor toward a target rotation speed and increase a motor torque until the traveling motor rotates to travel the vehicle over a level difference.

5. The vehicle control apparatus according to claim 4, wherein the control system is further configured to, when a rotation angle of the traveling motor exceeds a predetermined angle threshold after execution of the speed control mode, switch the control mode of the traveling motor from the speed control mode back to the torque control mode.

6. The vehicle control apparatus according to claim 4, wherein the control system is further configured to, when a component protection control that limits a target motor torque is being executed while the motor-lock state continues, execute a brake hold control to prevent movement of the vehicle, and temporarily control the motor torque of the traveling motor to zero to cancel the component protection control.

* * * * *